US007945754B2

(12) United States Patent
Kiyota

(10) Patent No.: US 7,945,754 B2
(45) Date of Patent: May 17, 2011

(54) MULTIPROCESSOR SYSTEM, PROCESSOR, AND CACHE CONTROL METHOD

(75) Inventor: Naohiro Kiyota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 449 days.

(21) Appl. No.: 12/230,019

(22) Filed: Aug. 21, 2008

(65) Prior Publication Data

US 2008/0320224 A1    Dec. 25, 2008

Related U.S. Application Data

(63) Continuation of application No. PCT/JP2006/303439, filed on Feb. 24, 2006.

(51) Int. Cl.
*G06F 12/00*    (2006.01)
(52) U.S. Cl. ........ 711/167; 711/119; 711/122; 711/163; 711/165
(58) Field of Classification Search .................. 711/119, 711/122, 163, 165
See application file for complete search history.

(56) References Cited

U.S. PATENT DOCUMENTS

| 4,426,681 | A |   | 1/1984 | Bacot et al. |
| 4,511,962 | A | * | 4/1985 | Machida et al. ............ 711/165 |
| 5,291,442 | A |   | 3/1994 | Emma et al. |
| 5,710,881 | A |   | 1/1998 | Gupta et al. |
| 5,802,571 | A |   | 9/1998 | Konigsburg et al. |
| 6,047,316 | A |   | 4/2000 | Barton et al. |
| 6,289,419 | B1 |  | 9/2001 | Takahashi |
| 6,360,298 | B1 | * | 3/2002 | Osanai et al. ................ 711/133 |
| 2002/0040382 | A1 |   | 4/2002 | Ueda |

FOREIGN PATENT DOCUMENTS

| JP | 3-25541 | 2/1991 |
| JP | 4-260146 | 9/1992 |
| JP | 7-191946 | 7/1995 |
| JP | 10-105464 | 4/1998 |
| JP | 10-154102 | 6/1998 |
| JP | 11-316712 | 11/1999 |
| JP | 2002-7371 | 1/2002 |
| JP | 2002-55966 | 2/2002 |
| JP | 2002-149489 | 5/2002 |
| JP | 2002-373115 | 12/2002 |
| JP | 2003-150573 | 5/2003 |

OTHER PUBLICATIONS

Japanese Office Action issued on Apr. 7, 2009 in corresponding Japanese Patent Application 2008-504910.
International Search Report mailed Aug. 1, 2006 for International Application No. PCT/JP2006/303439.
Extended European Search Report for EP 06 71 4578, issued on Jul. 28, 2010.

* cited by examiner

*Primary Examiner* — Jack A Lane
(74) *Attorney, Agent, or Firm* — Staas & Halsey LLP

(57) ABSTRACT

A multiprocessor system includes processors each having a primary cache and a secondary cache shared by the processors. The processors each include a read unit that reads data from the primary cache, a request unit that makes a write request when the data to be read is not stored in the primary cache, a measuring unit that measures an elapsed time since the write request is made, a receiving unit that receives a read command from an external device, a comparing unit that compares specific information for specifying data, for which the read command has been received, with specific information for specifying data, for which the write request has been made, and a controller that suspends reading of the data according to the read command, when pieces of specific information are the same, and the elapsed time measured is less than a predetermined time.

9 Claims, 6 Drawing Sheets

US 7,945,754 B2

MULTIPROCESSOR SYSTEM, PROCESSOR, AND CACHE CONTROL METHOD

CROSS REFERENCE TO RELATED PATENT APPLICATION

This application is a continuing application, filed under 35 U.S.C. §111(a), of International Application PCT/JP2006/303439, filed Feb. 24, 2006, the disclosure of which is incorporated herein by reference.

BACKGROUND OF THE INVENTION

1. Field of the Invention

The present invention relates to a multiprocessor system having a plurality of processors each including a primary cache and a secondary cache shared by the processors, and a cache control method, and, more particularly to a multiprocessor system, a processor, and a cache control method that can prevent competitions for data acquisition by a plurality of caches, and reduce delay in data transfer between caches.

2. Description of the Related Art

Generally, in an information processor, frequently used data is stored in a cache memory separate from a main memory, to improve processing speed. While the cache memory has a smaller capacity than that of the main memory, high-speed access is possible. Therefore, by storing the frequently used data in the cache memory, while replacing the data at any time, greater processing speed can be achieved.

To further achieve greater processing speed, the cache memory is provided hierarchically, and at the time of performing the processing, the primary cache having the highest speed (hereinafter, "L1 cache") is first accessed, and if there is no desired data in the L1 cache, then the secondary cache (hereinafter, "L2 cache") having the next highest speed is accessed.

On the other hand, to improve processing performance of the information processor, a plurality of processors can be mounted on one information processor. In recent years, as one type of such a multiprocessor system, an on-chip multiprocessor system in which a plurality of processors are mounted on one chip has been realized.

When the multiprocessor system is employed, the L2 cache shared by respective processors can be provided, separately from the L1 cache in each processor (for example, see Japanese Patent Application Laid-open No. 2002-373115).

In the multiprocessor system, if a cache miss occurs simultaneously relating to the same data in the L1 cache in each processor, a plurality of processors can access the shared L2 cache simultaneously to cause competitions for data acquisition.

A state where an L1 cache #1 and an L1 cache #2 compete for data A is explained below with reference to FIGS. 4A to 4F. It is assumed here that a store request indicating rewrite of data A is issued from a command controller (not shown) in each processor to the L1 cache #1 and the L1 cache #2, respectively.

As shown in FIG. 4A, because the data A is not stored in the L1 cache #1 and the L1 cache #2, the cache miss occurs, and a move in (hereinafter, abbreviated as "MI") request for requesting MI of the data A is made simultaneously to an L2 cache controller that controls the L2 cache.

At this time, for example, if priority of the L1 cache #1 is high, as shown in FIG. 4B, the data A is transferred from the L2 cache controller to the L1 cache #1. Further, because the MI request of the data A is also made to the L2 cache controller from the L1 cache #2, upon transfer of the data A to the L1 cache #1, a move out (hereinafter, abbreviated as "MO") command for moving the data A out from the L1 cache #1 is issued.

In the L1 cache #1, a store process of the data A has not been completed; however, according to the MO command from the L2 cache controller, as shown in FIG. 4C, an MO request for requesting MO of the data A is made, and the data A is transferred to the L2 cache controller. Simultaneously, the L2 cache controller transfers the data A to the L1 cache #2.

In the L1 cache #1 to which the data A is supposed to be transferred, a store request of the data A is made again. However, because the data A has been already transferred to the L1 cache #2, a cache miss occurs again in the L1 cache #1. Therefore, as shown in FIG. 4D, an MI request is made from the L1 cache #1 to the L2 cache controller, and an MO command is issued from the L2 cache controller to the L1 cache #2.

In the L1 cache #2, the store process of the data A has not been completed; however, according to the MO command from the L2 cache controller, as shown in FIG. 4E, an MO request for requesting MO of the data A is made, and the data A is transferred to the L2 cache controller. Simultaneously, the L2 cache controller transfers the data A to the L1 cache #1.

In the L1 cache #2 to which the data A is supposed to be transferred, a store request of the data A is made again. However, because the data A has been already transferred to the L1 cache #1, a cache miss occurs again in the L1 cache #2. Therefore, as shown in FIG. 4F, an MI request is made from the L1 cache #2 to the L2 cache controller, and an MO command is issued from the L2 cache controller to the L1 cache #1.

Thereafter, the state returns to the state in FIG. 4C, and any of the processor having the L1 cache #1 and the processor having the L1 cache #2 cannot complete the store process of the data A.

To prevent such a situation, a method in which after the MI request is once made and the data is transferred to the L1 cache, MO is prohibited in the L1 cache for a while can be considered. That is, for example, as shown in FIG. 5, the MI request obtains priority of a pipeline process, and after a process of predetermined P cycle is complete, a counter starts counting up of the predetermined cycle (in FIG. 5, 31 cycles). Thereafter, a process of a predetermined T cycle, a process of a predetermined M cycle, a process of a predetermined B cycle, and a process of a predetermined R cycle are performed with respect to the MI request, and data is stored in the L1 cache.

At this time, when the MO request obtains the priority of the pipeline process immediately after the MI request, for the MO request, because the counter is executing counting up, the process is suspended in the B cycle. Therefore, while the counter is executing counting up, the data is not transferred from the L1 cache, and the store process of the data can be performed in this period.

In this method, however, because data transfer from the L1 cache is prohibited while the counter is executing counting up, MO is not executed also for data irrelevant to the store process, thereby causing a problem that delay occurs in data transfer between caches.

SUMMARY

It is an object of the present invention to at least partially solve the problems in the conventional technology.

A multiprocessor system according to one aspect of the present invention includes a plurality of processors each including a primary cache, a read unit that reads data from the primary cache in the processor itself, a request unit that requests an external device to write the data in the primary cache, when the data to be read is not stored in the primary cache, a measuring unit that measures an elapsed time since a write request is made by the request unit, a receiving unit that receives a read command instructing to read data in the primary cache from an external device, a comparing unit that compares specific information for specifying the data, for which the read command has been received by the receiving unit, with specific information for specifying the data, for which the write request has been made by the request unit, and a controller that suspends reading of the data by the read unit according to the read command, when pieces of specific information are the same, as a result of comparison by the comparing unit, and the elapsed time measured by the measuring unit is less than a predetermined time, and the multiprocessor system further includes a secondary cache shared by the processors.

A processor according to another aspect of the present invention includes a cache that stores data, a write unit that writes data in the cache, a measuring unit that measures an elapsed time since data is written in the cache by the write unit, a receiving unit that receives a read command instructing to read data in the cache from an external device, a comparing unit that compares specific information for specifying the data, for which the read command has been received by the receiving unit, with specific information for specifying the data written by the write unit, and a read controller that suspends reading of the data according to the read command, when the pieces of specific information are the same as a result of comparison by the comparing unit, and the elapsed time measured by the measuring unit is less than a predetermined time.

A cache control method in a multiprocessor system having a plurality of processors each including a primary cache, and a secondary cache shared by the processors according to still another aspect of the present invention includes requesting an external device to write data in the primary cache, when the data to be read is not stored in the primary cache, starting measuring an elapsed time after a write request is made in the requesting, receiving a read command instructing to read data in the primary cache from an external device, comparing specific information for specifying the data, for which the read command has been received in the receiving, with specific information for specifying the data, for which the write request has been made in the requesting, and controlling to suspend reading of the data according to the read command, when pieces of specific information are the same, as a result of comparison in the comparing, and the elapsed time measured in the measuring is less than a predetermined time.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment of the present invention will be explained below in detail with reference to the accompanying drawings. While an example in which an information processor includes two CPUs as processors is explained below, the present invention is also applicable to cases where the information processor includes three or more processors.

Figure 1:
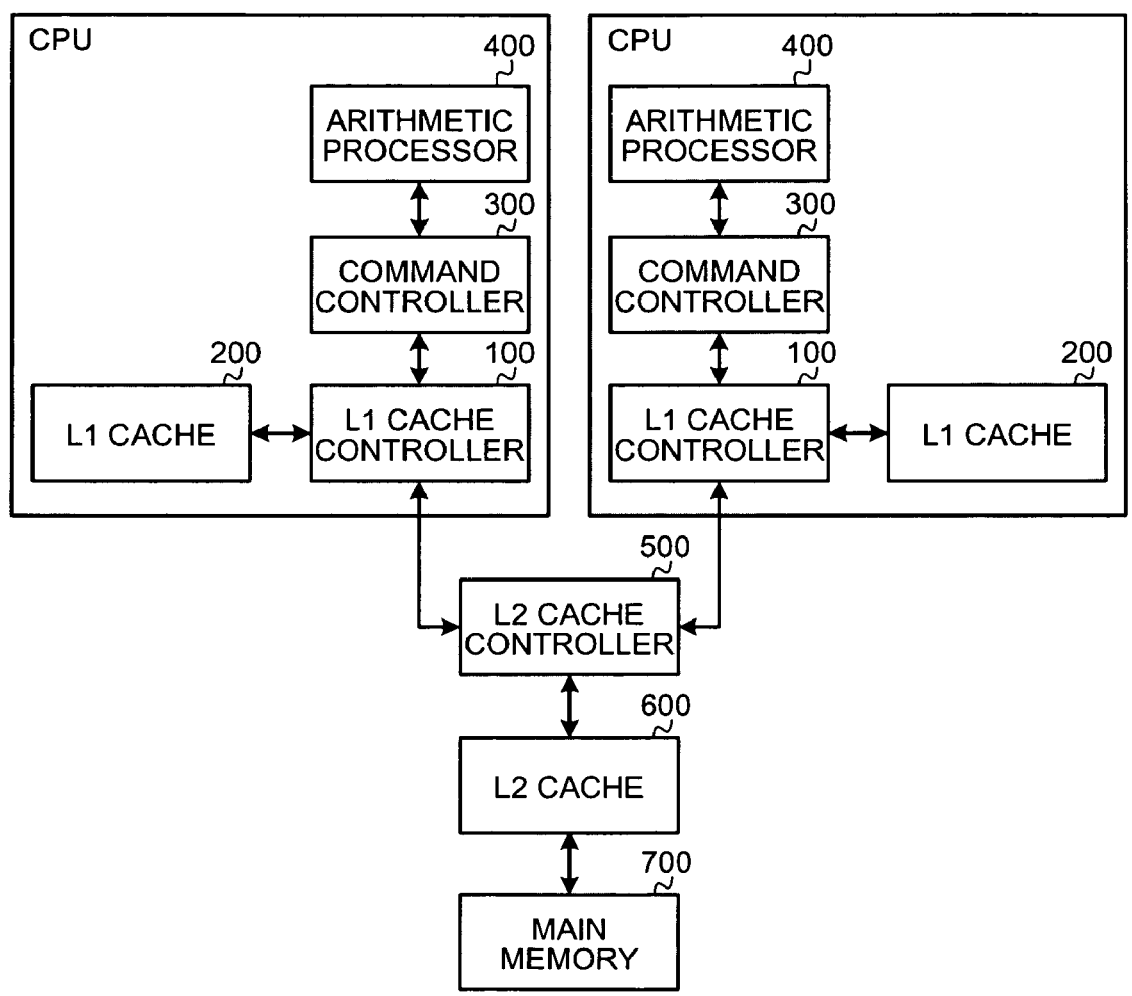
FIG. 1 is a block diagram of a configuration of relevant parts of a multiprocessor system according to one embodiment of the present invention.

FIG. 1 is a block diagram of a configuration of relevant parts of a multiprocessor system according to the embodiment of the present invention. The multiprocessor system shown in FIG. 1 includes two CPUs, and each CPU has an L1 cache controller 100, an L1 cache 200, a command controller 300, and an arithmetic processor 400. An L2 cache controller 500 is connected to the L1 cache controller 100 in each CPU, the L2 cache controller 500 is connected to an L2 cache 600, and the L2 cache 600 is connected to a main memory 700.

The L1 cache controller 100 controls move in (MI) and move out (MO) of data in the L1 cache, according to a request and a command from the command controller 300 and the L2 cache controller 500. In the present embodiment, the L1 cache controller 100 holds an address of the data, for which MI is to be requested, and when an MO command is issued from the L2 cache controller 500, the L1 cache controller 100 compares the address of data to be moved out with the held address, to suspend MO for a predetermined period after the MI request when the addresses match each other. A specific configuration and operations of the L1 cache controller 100 will be described later in detail.

The L1 cache 200 is a high-speed cache memory, and stores the data to be moved in and outputs the data to be moved out, under control of the L1 cache controller 100. The command controller 300 issues a command related with writing and reading of data according to arithmetic processing in the arithmetic processor 400, and obtains necessary data from the L1 cache 200, the L2 cache 600, or the main memory 700. The arithmetic processor 400 performs arithmetic processing with respect to the data obtained by the command controller 300.

When the MI request of data is issued from the L1 cache controller 100, the L2 cache controller 500 issues an MO command of the data to the L2 cache 600 in which the data is stored or to the L1 cache controller 100 that controls the L1 cache 200 in which the data is stored in the other CPU. The L2 cache 600 is a larger-capacity and lower-speed cache memory than the L1 cache 200, and is shared by the two CPUs. The main memory 700 is a primary memory and has a larger capacity and lower speed than the L2 cache 600.

Figure 2:
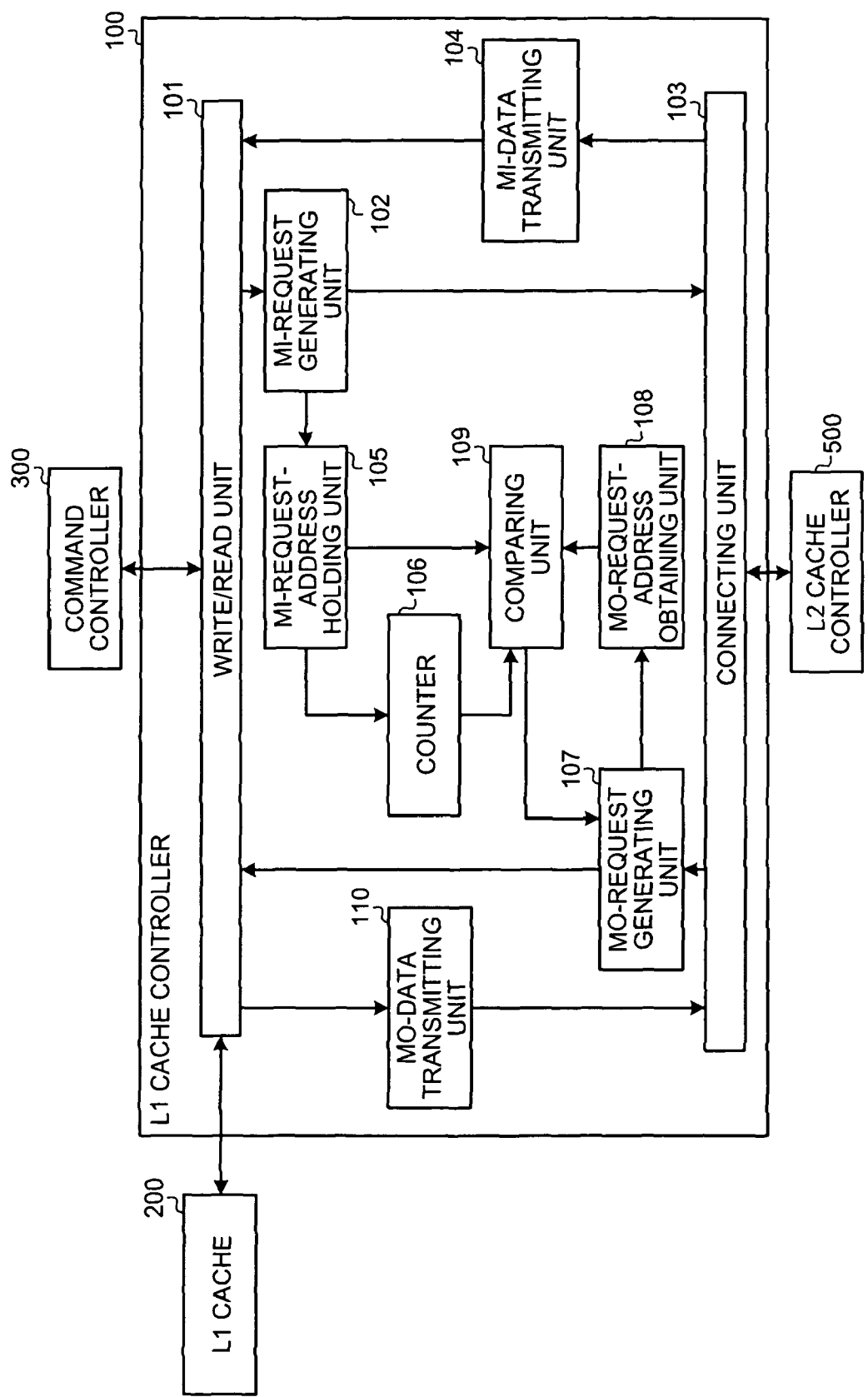
FIG. 2 is a block diagram of an internal configuration of an L1 cache controller according to the embodiment.

FIG. 2 is a block diagram of an internal configuration of the L1 cache controller 100 according to the present embodiment. As shown in FIG. 2, the L1 cache controller 100 includes a write/read unit 101, an MI-request generating unit 102, a connecting unit 103, an MI-data transmitting unit 104, an MI-request-address holding unit 105, a counter 106, an MO-request generating unit 107, an MO-request-address obtaining unit 108, a comparing unit 109, and an MO-data transmitting unit 110.

When a command such as a data store request is issued from the command controller 300, the write/read unit 101 searches the L1 cache 200, and if target data is stored in the L1 cache 200 (cache hit), the write/read unit 101 reads the data and outputs the data to the command controller 300. If the target data is not stored in the L1 cache 200 (cache miss), the write/read unit 101 notifies the MI-request generating unit 102 of the information. The write/read unit 101 then writes MI data to be moved in, which is transmitted from the MI-data transmitting unit 104, in the L1 cache 200. When an MO request of data is output from the MO-request generating unit 107, the write/read unit 101 reads target data from the L1 cache 200, and outputs the data to the MO-data transmitting unit 110.

When the write/read unit 101 notifies that a cache miss has occurred, the MI-request generating unit 102 generates an MI request including the address of data and outputs the MI request to the connecting unit 103 and the MI-request-address holding unit 105, to move the data in to the L1 cache 200.

The connecting unit 103 connects the L1 cache controller 100 and the L2 cache controller 500, transfers the MI request output from the MI-request generating unit 102 to the L2 cache controller 500. When MI data to be moved in according to the MI request is transferred from the L2 cache controller 500, the connecting unit 103 outputs the MI data to the MI-data transmitting unit 104. Further, when an MO command of the data from the L1 cache 200 is issued from the L2 cache controller 500, the connecting unit 103 notifies the MO-request generating unit 107 of the information, and transfers the moved out MO data transmitted from the MO-data transmitting unit 110 to the L2 cache controller 500.

The MI-data transmitting unit 104 transmits the MI data to the write/read unit 101 together with the MI request, to move the MI data transferred from the L2 cache 600 or the L1 cache 200 in the other CPU in to the L1 cache 200 in response to the MI request.

When the cache miss occurs, upon generation of the MI request by the MI-request generating unit 102, the MI-request-address holding unit 105 holds the address of the data included in the generated MI request (MI request address), and instructs the counter 106 to start counting up when the MI request address is held. That is, the MI-request-address holding unit 105 holds the address of data moved in to the L1 cache 200, and allows the counter 106 to start counting up.

When start is instructed from the MI-request-address holding unit 105, the counter 106 starts counting up, and when a counter value has reached a predetermined threshold, resets the counter value to 0. Further, the counter 106 notifies the comparing unit 109 of the start timing and reset timing.

When the MO command reaches the connecting unit 103, the MO-request generating unit 107 outputs the address of data (MO request address), for which MO is requested, to the MO-request-address obtaining unit 108. When execution of MO is instructed from the comparing unit 109, the MO-request generating unit 107 generates an MO request including the MO request address and outputs it to the write/read unit 101. On the other hand, when suspension of MO is instructed from the comparing unit 109, the MO-request generating unit 107 temporarily holds the MO request address, and when execution of MO is allowed from the comparing unit 109 after a predetermined period of time, the MO-request generating unit 107 generates an MO request including the held MO request address and outputs it to the write/read unit 101.

When an MO command is issued by the L2 cache controller 500, the MO-request-address obtaining unit 108 obtains the MO request address included in the MO command from the MO-request generating unit 107 and holds the MO request address.

When the MO request address is obtained by the MO-request-address obtaining unit 108, the comparing unit 109 compares the MO request address with the MI request address held by the MI-request-address holding unit 105. When the MO request address and the MI request address do not match each other, the comparing unit 109 determines that the store process with respect to the data, for which MO is requested, is not scheduled, and instructs the MO-request generating unit 107 to execute MO.

On the other hand, when the MO request address and the MI request address match each other, the comparing unit 109 determines whether the counter 106 is not reset and being operated. When the counter 106 is being operated, the elapsed time since the MI request is issued is short. Therefore, the comparing unit 109 determines that the store process with respect to the data at this address is scheduled, and instructs the MO-request generating unit 107 to suspend MO. Further, when the counter 106 is reset, and the counter value is 0, the comparing unit 109 determines that a sufficient time has elapsed since the MI request is issued, and that the store process with respect to the data at this address is complete, and instructs the MO-request generating unit 107 to execute MO.

When having instructed the MO-request generating unit 107 to suspend MO, the comparing unit 109 allows the MO-request generating unit 107 to execute the suspended MO, when a reset timing of the counter value is notified from the counter 106.

The MO-data transmitting unit 110 transmits the MO data read from the L1 cache 200 in response to the MO request to the connecting unit 103, to output the MO data to the L2 cache controller 500.

Figure 3:
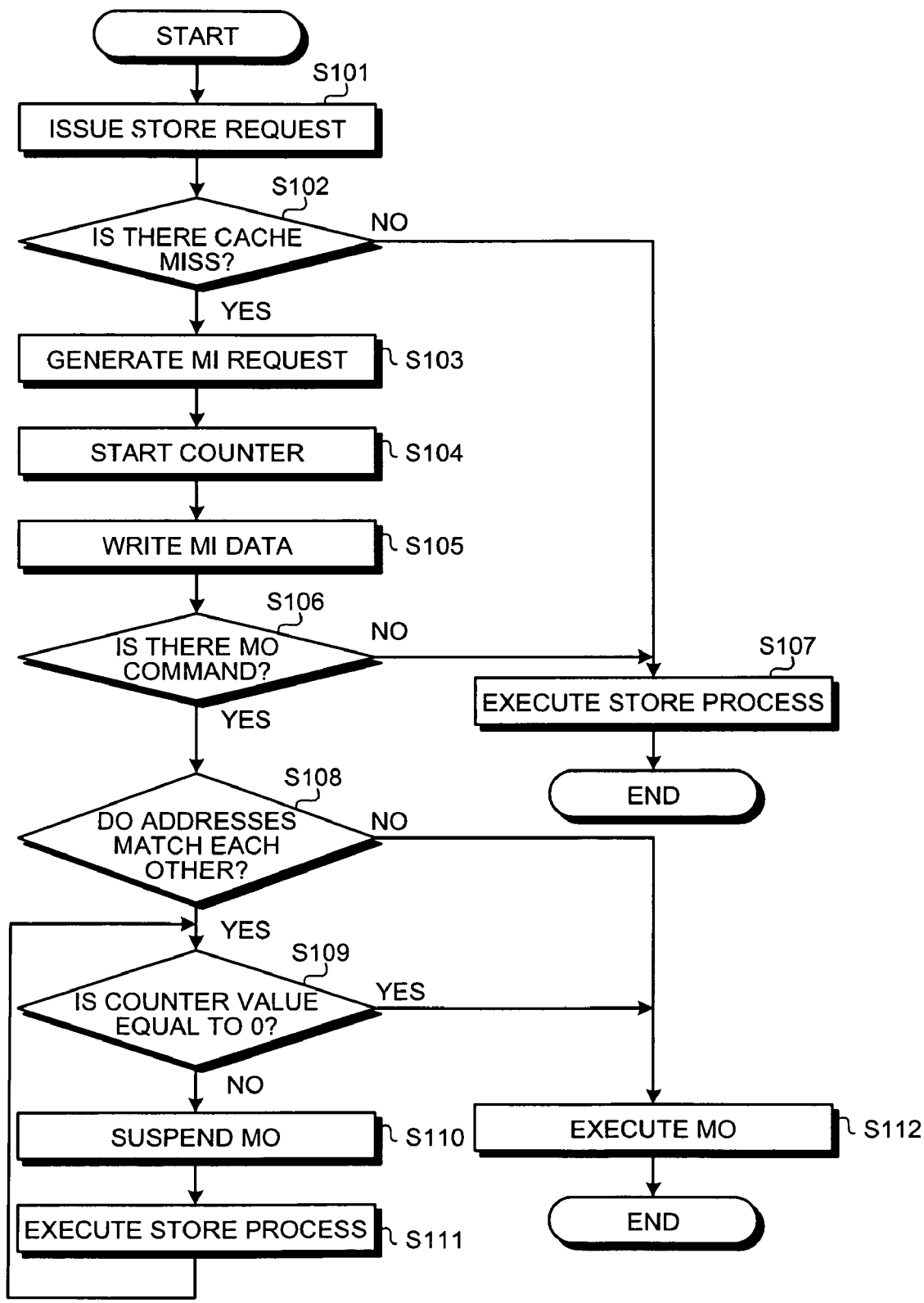
FIG. 3 is a flowchart of an operation of the L1 cache controller according to the embodiment.
Figure 4A:
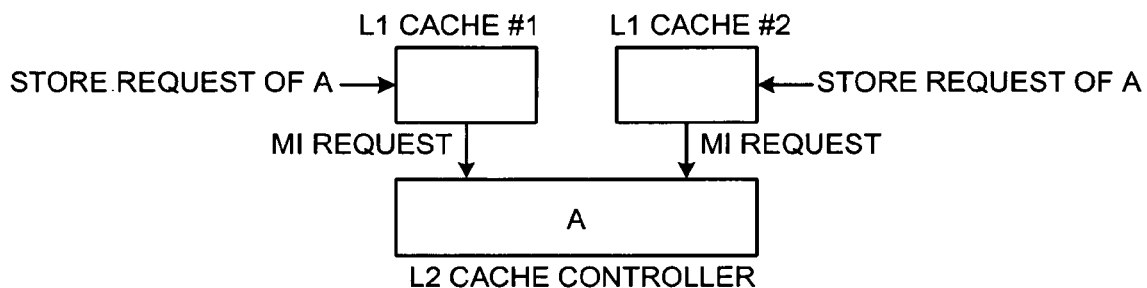
FIG. 4A depicts a state of a cache at the time of performing a store process.
Figure 4B:
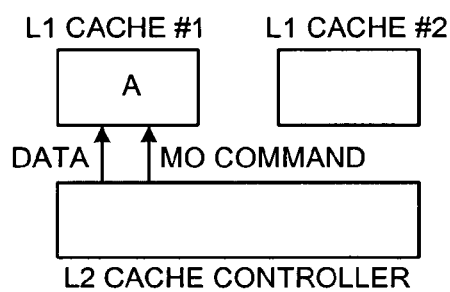
FIG. 4B is a continuation from FIG. 4A.
Figure 4C:
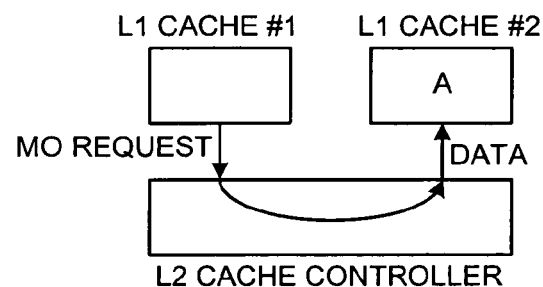
FIG. 4C is a continuation from FIG. 4B.
Figure 4D:
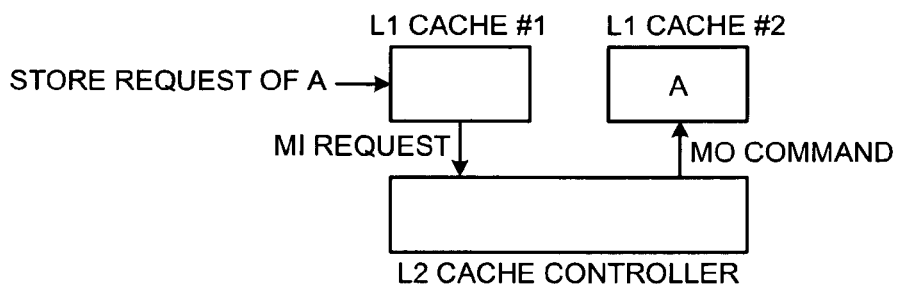
FIG. 4D is a continuation from FIG. 4C.
Figure 4E:
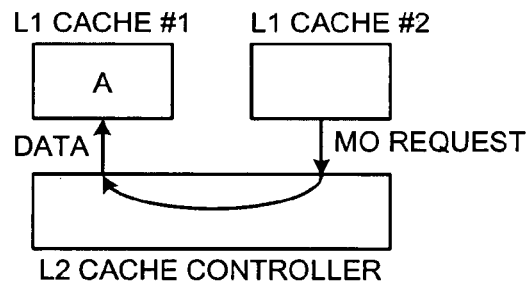
FIG. 4E is a continuation from FIG. 4D.
Figure 4F:
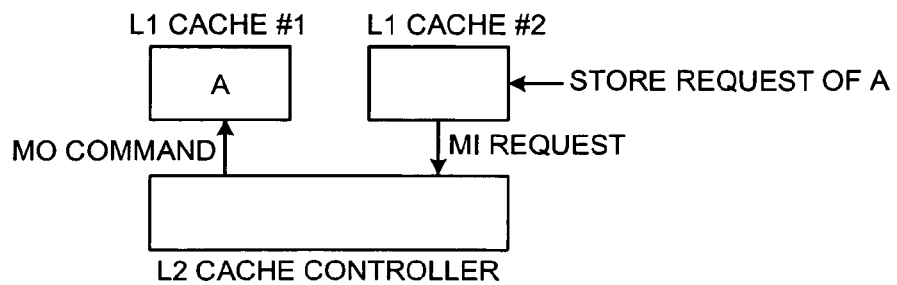
FIG. 4F is a continuation from FIG. 4E.
Figure 5:
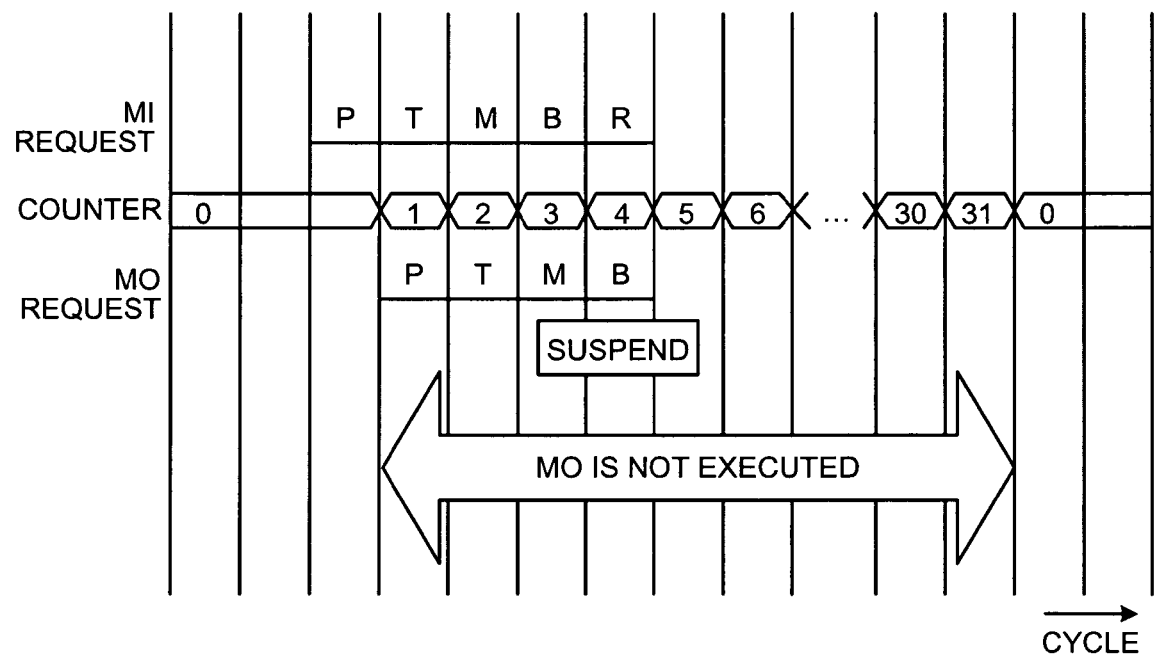
FIG. 5 is one example of a process cycle of a pipeline process.

The operation of the L1 cache controller 100 configured in the above manner when the store request is issued is explained with reference to a flowchart in FIG. 3.

A store request for requesting rewrite of data is issued by the command controller 300 (step S101). The issued store request is received by the write/read unit 101 in the L1 cache controller 100, and the write/read unit 101 searches the L1 cache 200 for the data to be stored (step S102). As a result of search, when the data is stored in the L1 cache 200 and it is a cache hit (NO at step S102), the data is read from the L1 cache 200 and output to the command controller 300, so that the arithmetic processor 400 executes the store process (step S107).

On the other hand, as a result of search, when the data is not stored in the L1 cache 200 and a cache miss occurs (YES at step S102), the write/read unit 101 notifies the MI-request generating unit 102 of the information, and the MI-request generating unit 102 generates an MI request including an address of the data to be stored (step S103). The generated MI request is output to the MI-request-address holding unit 105, and the MI request address (that is, the address of the data to be stored) is held by the MI-request-address holding unit 105, and start of the counter 106 is instructed (step S104).

The MI request generated by the MI-request generating unit 102 is transmitted to the L2 cache controller 500 via the connecting unit 103. The L2 cache controller 500 obtains the data at the MI request address from the L2 cache 600 or the L1 cache 200 in the other CPU, and transfers the data to the L1 cache controller 100. The data is output from the MI-data transmitting unit 104 to the write/read unit 101 together with the MI request, as the MI data to be moved in to the L1 cache 200, and written in the L1 cache 200 by the write/read unit 101 (step S105).

Thereafter, the L1 cache controller 100 receives the MO command from the L2 cache controller 500 at any time (step S106), and when the MO command does not reach the connecting unit 103 (NO at step S106), the store process of the data moved in corresponding to the cache miss in the L1 cache 200 is performed (step S107). Further, when the MO command reaches the connecting unit 103 (YES at step S106), the MO-request generating unit 107 outputs the MO request address included in the MO command to the MO-request-address obtaining unit 108.

When the MO-request-address obtaining unit 108 obtains the MO request address, the comparing unit 109 compares the MO request address with the MI request address held by the MI-request-address holding unit 105 (step S108). Matching of the compared addresses means that MO is requested with respect to the data moved in to the L1 cache 200 this time for performing the store process. Further, non-matching thereof means that MO is requested with respect to data other than the data moved in to the L1 cache 200 this time for performing the store process.

Therefore, if the MO request address and the MI request address do not match each other, execution of MO is instructed to the MO-request generating unit 107 by the comparing unit 109, and an MO request including the MO request address is generated by the MO-request generating unit 107 and output to the write/read unit 101. The data at the MO request address is read from the L1 cache 200 by the write/read unit 101, and output to the L2 cache controller 500 via the MO-data transmitting unit 110 and the connecting unit 103, to thereby execute MO of the data (step S112).

If the MO request address and the MI request address match each other, the comparing unit 109 determines whether the counter 106 is being operated, in other words, whether the counter value is 0 (step S109). If the counter 106 is not being operated, and the counter value is 0 (YES at step S109), the comparing unit 109 determines that a sufficient time has elapsed since the data is moved in, and the store process is complete with respect to the data moved in to the L1 cache 200 this time for the store process, and instructs the MO-request generating unit 107 to execute MO.

On the contrary, if the counter 106 is being operated, and the counter value is not 0 (NO at step S109), the comparing unit 109 determines that a sufficient time has not elapsed since the data is moved in, with respect to the data moved in to the L1 cache 200 this time for the store process, and instructs the MO-request generating unit 107 to suspend MO. The MO-request generating unit 107 does not generate the MO request from the MO request address, and suspends MO (step S110). At this time, the MO request address is temporarily held by the MO-request generating unit 107.

Because MO is suspended, the data just moved in to the L1 cache 200 is not moved out, and the store process according to the store request from the command controller 300 is executed during this period (step S111). Thereafter, when the counter 106 counts up to the predetermined threshold and resets the counter value to 0, the information is notified to the comparing unit 109. Because the counter value becomes 0 (YES at step S109), the comparing unit 109 instructs the MO-request generating unit 107 to execute the suspended MO.

The MO-request generating unit 107, to which execution of MO has been instructed, generates an MO request from the held MO request address to output the MO request to the write/read unit 101, so that the data is read from the L1 cache 200 and MO is executed (step S112).

According to the present embodiment, when MO of data is requested after MI to the L1 cache has been requested, the address of data, for which MO has been requested, is compared with the address of data, for which MI has been requested most recently. If the addresses match each other, and a predetermined period has not elapsed since MI request is made, MO of data is suspended. Therefore, the data just moved in to the cache is not moved out, whereas other data can be moved out. Accordingly, competitions for acquiring the data by a plurality of caches can be prevented, and delay in data transfer between caches can be reduced.

In the above embodiment, when the cache is configured by, for example, the set associative method, the way of the data to be moved in can be compared with the way of data, for which MO is requested, simultaneously with the comparison between the MI request address and the MO request address. When comparison is performed for the way, if the addresses and the ways match each other, and if a predetermined period has not elapsed since MI request is made, MO of data is suspended. At this time, when the set associative method is used, comparison of the addresses only for an index part, which is a part of the address, is sufficient. Therefore, the circuit size can be reduced, as compared with a case where the whole addresses are compared.

Further, in the above embodiment, when the MI request address is held, the counter starts counting up. However, the counter start timing can be when the data is moved in according to the MI request. By doing so, even when the data is not moved in immediately after the MI request is made, the time required for the store process can be reliably ensured.

According to the embodiment, when data to be read is not stored in the primary cache, writing of the data into the primary cache is requested to an external device, an elapsed time since the write request is measured, a read command indicating data read from the primary cache is received from the external device, specific information for specifying data, for which the read command has been received, is compared with specific information for specifying data, for which the write request has been made, and as a result of comparison, when the pieces of specific information are the same and when the measured elapsed time is less than a predetermined period of time, data read corresponding to the read command is suspended. Therefore, the data just written in the primary cache is prevented from being read, and a time for the processing with respect to the data can be ensured, to thereby prevent competitions for acquiring the data by a plurality of caches. Further, data other than the just written data can be read normally, whereby delay in data transfer between caches can be reduced.

According to the embodiment, as a result of comparison, when the pieces of specific information are not the same, a read request for requesting data read according to the read command is generated. Accordingly, the data not matching the just written data can be read from the primary cache, immediately after the reception of the read command.

According to the embodiment, as a result of comparison, even when the pieces of specific information are the same, if the measured elapsed time is equal to or longer than the predetermined period of time, a read request for requesting data read is generated according to the read command. Therefore, if the time required for the processing has been elapsed since data writing, even data written immediately before can be read from the primary cache, immediately after the reception of the read command, whereby the delay in the data transfer can be reduced further.

According to the embodiment, when the measured elapsed time has reached the predetermined period of time, reading of data which has been suspended is performed. Therefore, delay in the data transfer can be reduced to the minimum also for the data, for which reading from the primary cache has been once suspended.

According to the embodiment, because an address of data in the main memory is compared as the specific information, matching or non-matching of data can be reliably determined.

According to the embodiment, because a part of the address corresponding to the data and a way in the primary cache are compared as the specific information, matching or non-matching of data can be reliably determined, even when the cache is configured by a set associative method.

According to the embodiment, because an elapsed time is measured since data is written in response to the write request, the time required for the processing since the data is written reliably in the primary cache can be ensured.

According to the embodiment, data is written in the cache, an elapsed time since the data is written in the cache is measured, a read command indicating read of data in the cache is received from an external device, specific information for specifying data, for which the read command has been received, is compared with specific information for specifying written data, and as a result of comparison, if the pieces of specific information are the same and when the measured elapsed time is less than a predetermined period of time, data read according to the read command is suspended. Therefore, data just written in the cache is prevented from being read, and a time for the processing with respect to the data can be ensured, to thereby prevent competitions for acquiring the data by a plurality of caches. Further, data other than the just written data can be read normally, whereby delay in data transfer between caches can be reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A multiprocessor system comprising:
    a plurality of processors each including
        a primary cache,
        a read unit that reads data from the primary cache in the processor itself,
        a request unit that requests an external device to write the data in the primary cache, when the data to be read is not stored in the primary cache,
        a measuring unit that measures an elapsed time since a write request is made by the request unit,
        a receiving unit that receives a read command instructing to read data in the primary cache from an external device,
        a comparing unit that compares specific address information for specifying the data, for which the read command has been received by the receiving unit, with specific address information for specifying the data, for which the write request has been made by the request unit, and
        a controller that suspends reading of the data by the read unit according to the read command, when pieces of specific address information are the same, as a result of comparison by the comparing unit, and the elapsed time measured by the measuring unit is less than a predetermined time;
    a secondary cache shared by the processors.

2. The multiprocessor system according to claim 1, wherein the controller includes a generating unit that generates a read request for requesting the read unit to read the data according to the read command, when the pieces of specific address information are not the same as a result of comparison by the comparing unit.

3. The multiprocessor system according to claim 2, wherein the generating unit generates the read request of the data according to the read command, even when the pieces of specific address information are the same as a result of comparison by the comparing unit, if the elapsed time measured by the measuring unit is equal to or longer than a predetermined time.

4. The multiprocessor system according to claim 1, wherein when the elapsed time measured by the measuring unit reaches the predetermined time, the controller allows the read unit to read the data, whose readout has been suspended.

5. The multiprocessor system according to claim 1, wherein the comparing unit compares an address of data in a main memory as the specific address information.

6. The multiprocessor system according to claim 1, wherein the comparing unit compares a part of an address and a way in the primary cache corresponding to the data as the specific address information.

7. The multiprocessor system according to claim 1, wherein the measuring unit measures the elapsed time since the data is written in response to the write request by the request unit.

8. A processor comprising:
    a cache that stores data;
    a write unit that writes data in the cache;
    a measuring unit that measures an elapsed time since data is written in the cache by the write unit;
    a receiving unit that receives a read command instructing to read data in the cache from an external device;
    a comparing unit that compares specific address information for specifying the data, for which the read command has been received by the receiving unit, with specific address information for specifying the data written by the write unit; and
    a read controller that suspends reading of the data according to the read command, when the pieces of specific address information are the same as a result of comparison by the comparing unit, and the elapsed time measured by the measuring unit is less than a predetermined time.

9. A cache control method in a multiprocessor system having a plurality of processors each including a primary cache, and a secondary cache shared by the processors, comprising:
    requesting an external device to write data in the primary cache, when the data to be read is not stored in the primary cache;
    starting measuring an elapsed time after a write request is made in the requesting;
    receiving a read command instructing to read data in the primary cache from an external device;
    comparing specific address information for specifying the data, for which the read command has been received in the receiving, with specific address information for specifying the data, for which the write request has been made in the requesting; and
    controlling to suspend reading of the data according to the read command, when pieces of specific address information are the same, as a result of comparison in the comparing, and the elapsed time measured in the measuring is less than a predetermined time.

* * * * *